United States Patent [19]

Hanner

[11] 4,243,302
[45] Jan. 6, 1981

[54] OPTICAL DISPLAY DEVICE

[75] Inventor: Otto Hanner, Anzing, Fed. Rep. of Germany

[73] Assignee: Siemens Aktiengesellschaft, Berlin & Munich, Fed. Rep. of Germany

[21] Appl. No.: 881,043

[22] Filed: Feb. 24, 1978

[30] Foreign Application Priority Data

Mar. 21, 1977 [DE] Fed. Rep. of Germany ....... 2712325

[51] Int. Cl.³ ............................................. G02F 1/133
[52] U.S. Cl. .................... 350/345; 350/334
[58] Field of Search ................ 350/345, 331, 336, 334

[56] References Cited

U.S. PATENT DOCUMENTS

| | | | |
|---|---|---|---|
| 4,111,534 | 9/1978 | Cirkler et al. | 350/345 |
| 4,142,781 | 3/1979 | Baur et al. | 350/345 |
| 4,167,307 | 9/1979 | Cirkler | 350/345 |

FOREIGN PATENT DOCUMENTS

| | | |
|---|---|---|
| 2158563 | 6/1972 | Fed. Rep. of Germany . |
| 2554226 | 6/1977 | Fed. Rep. of Germany . |
| 2616669 | 10/1977 | Fed. Rep. of Germany . |
| 2619285 | 11/1977 | Fed. Rep. of Germany . |
| 2619352 | 11/1977 | Fed. Rep. of Germany . |
| 2619367 | 11/1977 | Fed. Rep. of Germany . |
| 2619368 | 11/1977 | Fed. Rep. of Germany . |
| 2640909 | 3/1978 | Fed. Rep. of Germany . |
| 1372868 | 11/1974 | United Kingdom . |

*Primary Examiner*—Edward S. Bauer
*Attorney, Agent, or Firm*—Hill, Van Santen, Steadman, Chiara & Simpson

[57] ABSTRACT

An optical display device for symbols having a body of material, having an index of refraction, which is greater than 1, and at least one symbol, character or the like, which is in optical contrast with the background, characterized by the body containing fluorescent particles, having a surface which is at least partially reflective, and each of the characters or symbols or the like being formed by appropriately shaped output coupling zones in the body. Preferably, the output coupling zones are formed by indentations on a rear surface of the body when taken in the direction of observation. Preferably, the device includes a light valve for at least some of the output coupling zones so that both static symbols and controllable symbols may be displayed.

2 Claims, 4 Drawing Figures

U.S. Patent  Jan. 6, 1981  4,243,302
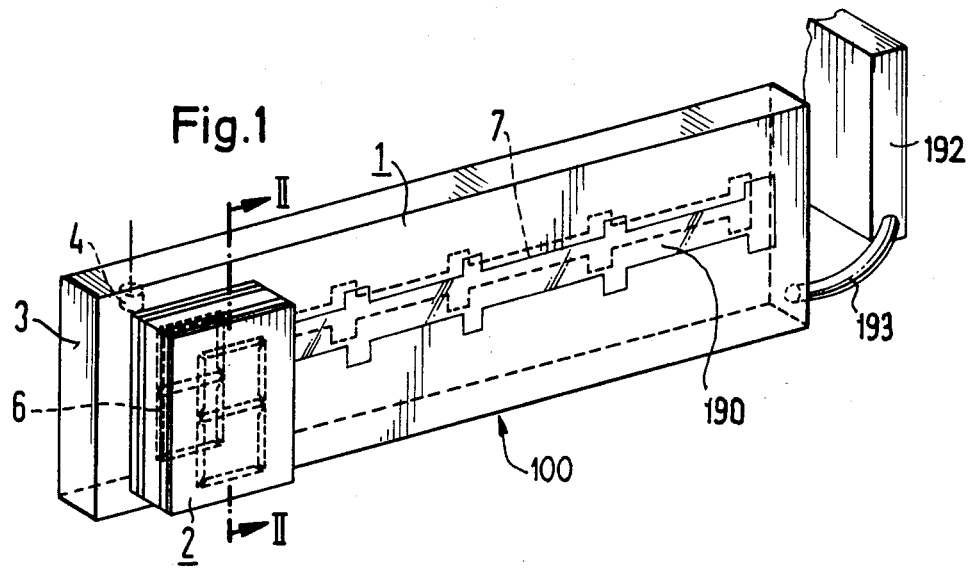
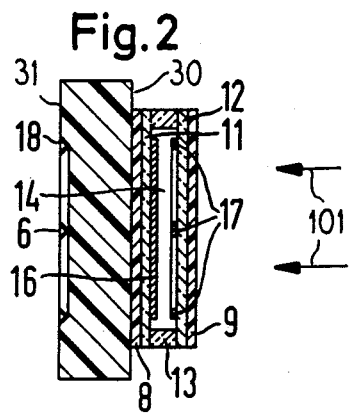 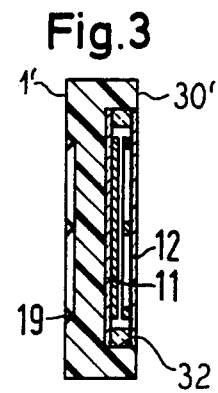
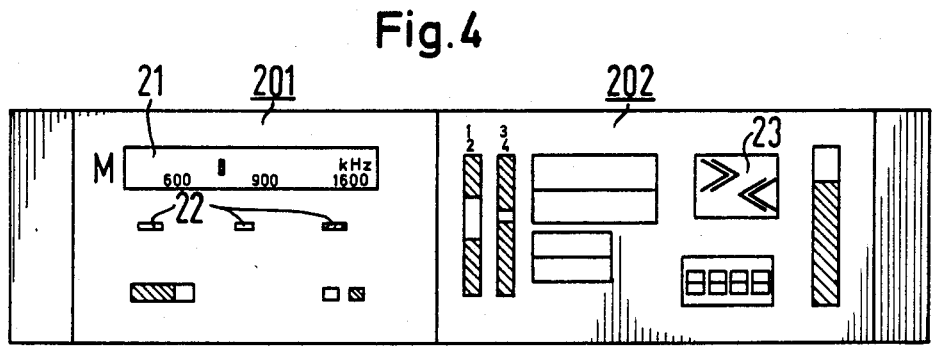

OPTICAL DISPLAY DEVICE

BACKGROUND OF THE INVENTION

The present invention is directed to an optical display device having a body preferably in a plate-shape which consists of a material having an index of refraction greater than 1 and has at least one character, symbol or the like which is in optical contrast with the background.

Display devices are being increasingly adopted for optically representing information of different kinds, for example, information concerning the operating state of an electrically controllable device. The displays required for this purpose are frequently used in mass produced articles such as program displays for washing machines or transmitter scales for radios and, therefore, require as simple as possible construction to supply a contrast of uniform quality. In addition, the symbol must also be readable from oblique directions and if additional illumination is required, this additional illumination should consume as little power as possible.

SUMMARY OF THE INVENTION

The present invention is directed to providing an optical display device which fulfills the above mentioned requirements of being easily mass produced, provide a uniform contrast for the symbol being displayed, be readable even from oblique directions and if additional illumination is provided consume as little power as possible. To accomplish these tasks, the present invention is directed to an improvement in optical display device for symbols which device has a body of material having an index of refraction, which is greater than 1, and has at least one symbol, character or the like, which is an optical contrast with the background. The improvement comprises the body containing fluorescent particles and having a surface which is at least partially reflected, and each of the characters, symbols or the like being formed by appropriately shaped output coupling zones in the body. The output coupling zones are preferably light outlet windows.

A fluorescent body provided in accordance with the present invention will collect a major part of the ambient or environmental light which strikes it by means of fluorescent dispersion and subsequent internal reflection. The light in the body is output coupled through special light outlet windows in the form of a highly concentrated or high intensity light relative to the background light. Therefore, a light image is formed on a dark background and the contrast of the image is predetermined by the ratio of the light collecting surface to the light emitting surface of the fluorescent body. Thus, the lightness or brightness of the image is dependent upon the surrounding intensity of the light so that the image cannot be swamped even when in an extremely bright ambient light. However, the proposed display element not only possesses excellent optical properties, but can also be produced in a simple manner and very economically. Thus, for example, it is possible to entirely dispense with the roughening of surfaces and subsequently rendering the roughened surface reflective, which is usually required in light conductors for homogeneous beam distribution and which constitutes a relatively expensive operating process.

It is noted that fluorescent bodies have already been described in detail in the co-pending U.S. application Ser. No. 747,035 which issued as U.S. Pat. No. 4,142,781 and includes the disclosure of German Offenlegungsschrift 25 54 226, 26 16 669, 26 40 909. However, in this co-pending application, the fluorescent body is only used in a display device in association with light valves.

If the fluorescent body is additionally combined in the display with a light valve, a particular advantage can be achieved. "Hybridization" of the fluorescent body and light valves permits the display of predetermined items of information as well as electrically variable items of information. Thus, for example, in a display panel for a washing machine, it would be possible to represent both the selected program cycle and the instantaneous state of this program cycle. In a broadcasting apparatus such as a radio, the display can illustrate the operating nature and state and in addition the frequency within a selected frequency band.

If the proposed display device is to be employed in a location in which unfavorable light conditions may be expected, the display can be equipped with means for providing additional illumination. The power consumption of the light source of the means for providing additional illumination is relatively low even with the weakest ambient light condition. Since the fluorescent body always supplies a contribution to the image brightness, it is possible to use a lamp of relatively weak light and comparable short switch-on times. Further details concerning installation of means for additional illumination into a fluorescent body can be obtained from a co-pending U.S. patent application Ser. No. 791,519 which issued as U.S. Pat. No. 4,167,307 and corresponds to German Offenlegungsschrift No. 26 19 367.

If the display is to be colored, a fluorescent substance having suitable emission spectrums will be selected. If a quite specific color tone is to be achieved, the light outlet windows, which are generally indentations arranged on the rear surface of the body, can be additionally provided with frequencies selectively reflective coatings forming dielectric reflectors. A dielectric reflector of this kind does not absorb the non-reflecting light component and, therefore, facilitate a high light yield than conventional colored filters. Instead of a dielectric reflector, it is also possible to use frequency selective transparent dielectric coatings forming dielectric windows on a front surface of the body. Both types of frequency selected coatings can be constructed to provide multi-representations in the simple fashion. Greater details of such arrangement are disclosed in German Offenlegungsschrift No. 26 19 368.

Normally, the fluorescent body has the shape of a plate and the light outlet windows are arranged as indentations and/or dispersion surfaces on one of the two large surfaces of the plate. However, under certain circumstances, it can be advisable to deviate from this construction. For example, when large collecting surfaces are required but only a small surface area is available, the fluorescent body having a large construction depth could be used and the light could be output coupled from a narrow edge of the body, possibly one of the four side edges of the plate. In this case, the outlet window can be produced in a simple fashion by means of recesses in a reflective layer which usually covers the side edges of the plate.

Finally, other applications of the display device are also conceivable in which it is more favorable not to equip the display device itself with a lamp or a large collecting surface, but to supply it with light which is collected and/or produced in an additional fluorescent body positioned, for example, at a location enjoying a more favorable light condition. This second fluorescent body or plate can also be designed as a display device of the proposed type. Suitable light conductors, for example, light conducting fibers are available for light transmission from the second or additional fluorescent body to the first body. A compound display of this type has already been described and illustrated in German Offenlegungsschrift 26 19 285.

Additional advantageous embodiments and further developments of the invention will be apparent from the description of the illustrative embodiments and the claims.

BRIEF DESCRIPTION OF THE DRAWINGS

FIG. 1 is a perspective view of an illustrative embodiment of a display device in accordance with the present invention;

FIG. 2 is a cross-sectional view taken along lines II—II of FIG. 1;

FIG. 3 is a cross-sectional view similar to FIG. 2 of an embodiment of the display device in accordance with the present invention; and FIG. 4 is a plan front view of a third exemplary embodiment.

DESCRIPTION OF THE PREFERRED EMBODIMENTS

The principles of the present invention are particularly useful in a hybrid optical display device generally indicated at 100 in FIG. 1. The display device 100 includes a plate-shaped body 1 and a liquid crystal cell 2 which is disposed on a front surface 30 (FIG. 2) of the plate-shaped body 2 when viewed in the direction of observation which is illustrated by arrows 101. It should be noted that structural element such as electrical supply lines for the liquid crystal cell 2, which are not necessary for understanding the operation of the device 100 have not been illustrated.

The fluorescent plate 1 consists of an acrylic glass in which a fluorescent substance is dissolved. The four side surfaces of the plate 1 are coated with a reflective layer 3, which is preferably a so-called "hot embossed foil" which is pressed into position on the edge at elevated temperature and increased pressure. Embedded within the plate 1 is a lamp 4 which in the present case is a light emitting diode although it could be selected from a group consisting of light emitting diodes, fluorescent lamps, and incandescent lamps. A rear surface of the plate contains light outlet windows 6 in the form of indentations, which form the output coupling zones of the plate.

The liquid crystal cell 2, as best illustrated in FIG. 2, is a conventional construction and is, in the present case, operates in a so-called "twisted nematic cell" which is conventionally known and described in greater detail in the British Pat. No. 1,372,868 which corresponds to German Offenlegungsschrift No. 21 58 563. As illustrated, the cell 2 includes two linear polarizers 8 and 9 which are arranged in parallel one to the other, two carrier plates 11 and 12 and a spacing frame 13 which is disposed between the two carriers to form a chamber. The chamber, which is formed by the frame 13 and the two carrier plates 11 and 12 contains a liquid crystal substance 14. On the inner surfaces, the carrier plates 11 and 12 are provided with a transparent conductive coating which form electrodes. The conductive coating on the plate 11 forms a continuous rear electrode 16 and the conductive coating on the carrier plate 12 forms segments 17 of a segment electrode.

In the illustrated embodiment of the device 100, the light valve formed by the liquid crystal cell 2 is a one digit display with its segment electrode aligned with indentation 6 of the outlet window. Both the segments and the outlet window are arranged in the form of a figure eight.

In addition to the outlet window 6, the remaining portion of the plate 1 is provided with a scale, which has a plurality of graduations. This scale is determined by the shape of indentations 7 which are provided on the rear surface 31 of the plate 1. Since the polarizers 8 and 9 of the rotary cell weaken light passing therethrough by at least 50%, the indentations 6 are preferably coated with a highly reflective silver layer 18 so that the light decoupled by the indentation 7 of the scale and the light decoupled by the indentations 6 possess the same overall illuminous power or brightness. The light outlet windows can also consist of embossed or cast metal components.

In its operation, the liquid crystal layer 14 while unenergized will cause the polarized light passed by the polarizer 8 to be twisted or rotated 90° so it cannot pass through the polarizer 9. When a field is applied between the segment 17 and the continuous electrode 16, the molecules of the liquid crystal layer assume a homeotropic orientation which does not change the direction of polarization so that the light which passed the polarizer 8 in the area of the energized electrodes can pass through the polarizer 9.

In the embodiment illustrated in FIG. 3, the liquid crystal cell operates under a different principle and, therefore, includes a different structural arrangement as well as design of the light outlet windows. The liquid crystal cell in the embodiment of FIG. 3 is free of polarizers and is a dynamic scattering-type cell. As illustrated, the cell has carrier plates 11 and 12 separated by a frame with the plates 11 and 12 being provided with the coatings to form the electrodes. The cell is disposed in a recess 32 which it provided on a front surface 30' of the fluorescent plate 1'. As illustrated, the cell is flush with the surface 30'. Light valves formed by liquid crystals received in a recess of a fluorescent plate are described in greater detail in co-pending U.S. patent application Ser. No. 791,514, which issued as U.S. Pat. No. 4,111,534 and corresponds to German Offenlegungsschrift No. 26 19 352. The indentations forming the outlet window are provided with frequency selectively reflective, dielectric multiple layer 19 which forms a dielectric reflector and is designed in a known manner in such a way that the digit of the light valve, the first section and second section of the scale each light up in different colors. In order for this to occur, the fluorescent plate must contain a fluorescent substance mixture, which includes materials providing an emission spectrum for each of the three colors.

In either the embodiments of FIGS. 2 and 3, the surfaces of the indentation forming the light output window may be covered with a dielectric reflector with the surface forming an angle with the direction of the strongest light being emitted through the windows so that the light output is coupled in parallel with the main outlet direction and is linearly polarized. Also it should be noted, that in both the embodiments of FIGS. 1–3 the output coupling zone can comprise outlet windows containing frequency selective transparent dielectric coatings forming a dielectric window which may be disposed on a front surface 30 or 30' of the plate 1 or 1', such as shown by the transparent dielectric coating 190 in FIG. 1. Each of the dielectric windows may be selected to allow given frequencies or colors to be emitted from the plate with the frequency and the color being selected to lie in the emission spectrum of the fluorescent particles.

A second fluorescent plate 192 may be provided to collect light. To transfer the light collected in plate 192 to the plate 1, a light conductor 193, which may be a bundle of light conducting fibers, is provided.

In FIG. 4 a front view of a combined radio and tape recording display is illustrated. In this view, a rectangular front side of the plate-shaped fluorescent body is virtually entirely covered by two "twisted nematic" cells 201 and 202, and strip-shaped zones which serve to capture the ambient light remain only on the two narrow surfaces. The cell 201 serves as a broadcast display and the cell 202 as a recording tape display. In the present case, only partial zones of the two liquid crystal cells, which are illustrated as blocks in the figure, have been covered with polarizers. Only those zones such as the scale 21, the transmitter displays 22 and tape transport 23 are switchable between a light and dark condition.

The requisite indications of the represented functions are contained either outside or inside of the switchable zones. If they are arranged outside the switchable zone, they are embossed onto the fluorescent plate 1. If they lie inside the surface covered with polarizers, it is necessary to differentiate between the nature of the symbols, for example, written items such as operating state information should be introduced into the fluorescent plate and positioned at the rear of the surface operable cell window so that the design of the light exploitation is optimum. If the symbols are of a more simple construction, for example, characters for individual programs or program steps, it would be preferred to use surface light outlet windows in combination with suitable etched electrode of the liquid crystal cell forming the light valve. If the characters are arranged closely next to one another, equally good contrast is achieved with a large observation angle range. If continuous variable parameters such as the degree of the device modulation are to be displayed, it should be expedient to select a quasi-analogue representation.

The invention is not only limited to the representative exemplary embodiments. Thus, the proposed display elements can be in many cases used without the light valve and the additional illumination means. Furthermore, the fluorescent body need not be always in a plate-shape, to consist of a solid carrier material, and to contain the indentations as light outlet windows. Furthermore, in the scope of the invention, an expert is at liberty to form the symbols in different distribution between body and the light valve and/or in different techniques. Finally, multi-colored displays could also be achieved not only by dielectric coating but also by assembly or interlocking of a plurality of fluorescent plates having different fluorescent additions.

Although various minor modifications may be suggested by those versed in the art, it should be understood that I wish to embody within the scope of the patent warranted hereon, all such modifications as reasonably and properly come within the scope of my contribution to the art.

I claim:

1. An optical display device comprising a first fluorescent plate containing fluorescent particles, light outlet windows in the form of indentations on two regions of a rear surface of said first plate, the indentations in the first region being in the shape of at least one digit, the indentations in the second region being in the shape of a scale having a plurality of graduations, said indentations having frequency selective dielectric coatings for reflecting frequencies in the emission spectrum of the fluorescent particles, reflective layers on the side surfaces of the plate, a lamp embedded within said plate, a twisted nematic liquid crystal cell adjacent the front surface of said plate aligned with only said first region, said liquid crystal cell having electrodes in the shape of segments being aligned with the indentations in said first region, a second fluorescent plate for collecting light, and a bundle of light conductive fibers for transferring light from said second fluorescent plate to said first fluorescent plate.

2. An optical display according to claim 1, wherein said frequency selective dielectric coatings form an angle with the direction of the strongest light being emitted through the window so that the light output is coupled in parallel with the main outlet direction and is linearly polarized.

* * * * *